United States Patent

[11] 3,566,826

| [72] | Inventor | Lloyd M. Forster<br>1624 Lochridge Road, Bloomfield Hills, Mich. 48013 |
|---|---|---|
| [21] | Appl. No. | 764,843 |
| [22] | Filed | Oct. 3, 1968 |
| [45] | Patented | Mar. 2, 1971 |

[54] AIRCRAFT DRIFT METER
1 Claim, 4 Drawing Figs.

[52] U.S. Cl. .................................................. 116/28,
33/46, 116/114, 116/135, 244/1
[51] Int. Cl. ...................................................... B60q
[50] Field of Search ........................................ 116/124,
28, 129, 114, 135; 244/1, 83, 84;
33/462, 64(A) (Consulted)

[56] References Cited
UNITED STATES PATENTS
| 1,419,335 | 6/1922 | Webster et al. ............... | 33/64 |
| 2,499,993 | 3/1950 | Gregg .......................... | 244/1 |

FOREIGN PATENTS
| 609,241 | 9/1948 | Great Britain ................ | 116/129 |

Primary Examiner—Louis J. Capozi
Attorney—Farley, Forster and Farley

ABSTRACT: An aircraft drift meter comprising a centerline mark on the cowling parallel to the longitudinal axis of the aircraft and in line with the center of the pilot's seat. A plurality of incrementally angular lines marked on the cowling on either side of the centerline radiating from a center point coinciding approximately with the pilot's eye position in order to facilitate pilot observation while in flight with visual land contact of the actual track of the aircraft by alignment of a radial line on the cowling with a landmark which maintains such alignment.

PATENTED MAR 2 1971
3,566,826
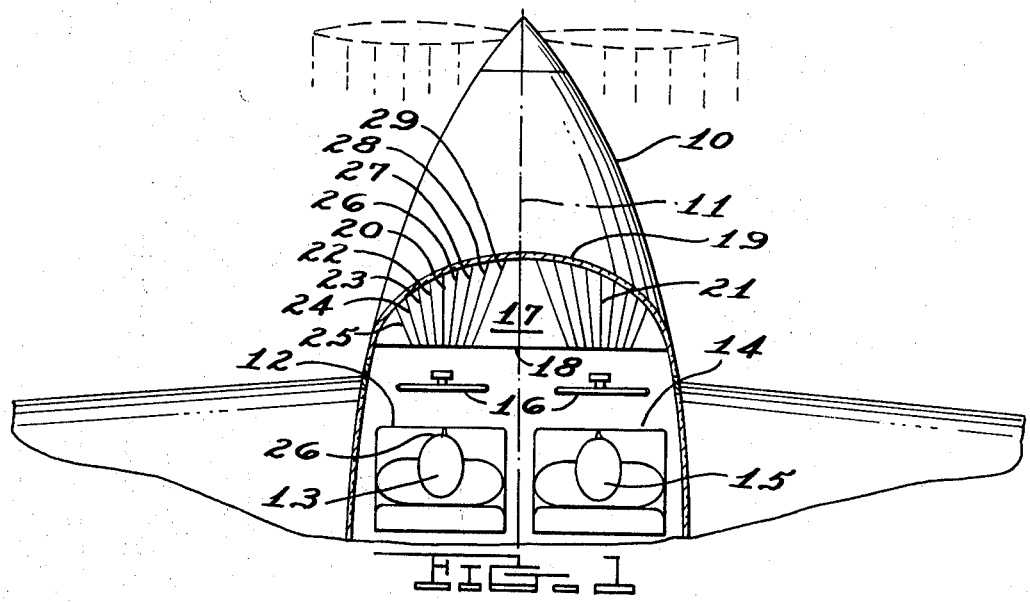
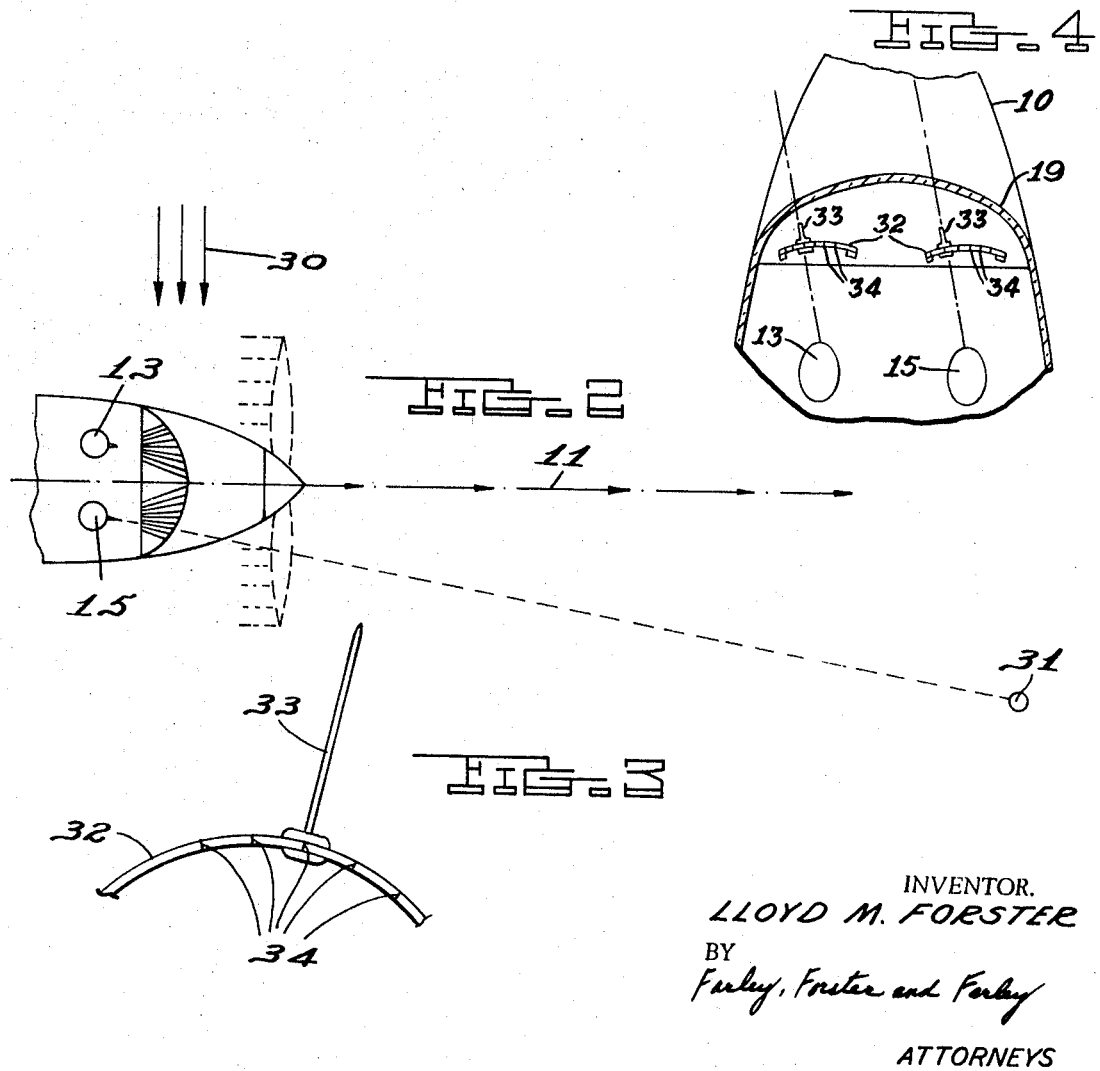
INVENTOR.
LLOYD M. FORSTER
BY
Farley, Forster and Farley
ATTORNEYS

AIRCRAFT DRIFT METER

BACKGROUND OF THE INVENTION

Drift meters have been employed in aircraft, installed in the floor, and normally include a rotatable centerline and compass rose which will indicate the relative angle of drift when the centerline is aligned with the observed track of the aircraft. Such drift meters require navigator or copilot observation due to their remote location and are relatively expensive and impractical for use in general private aircraft where the problem of drift is most serious. Thus, a need exists particularly for students and inexperienced pilots for a simple and inexpensive drift meter which can be used directly by the pilot without undue distraction from his normal flying in order to facilitate maintenance of a preselected course of flight. Even where omni to omni radio navigation facilities are employed the maintenance of the aircraft on a given "to" or "from" omni radio bearing can be greatly facilitated with accurate knowledge of the drift correction required; furthermore, in such cases where navigation is undertaken without a direct omnibearing available, knowledge of drift correction requirements is essential in cross-country flying of any appreciable distance.

SUMMARY OF THE INVENTION

The drift meter disclosed herein is directed to meet this need in a very simple and inexpensive manner which is nevertheless accurate and easy to use without distraction from normal flying operations. A distinctive centerline and 5° incremental radial lines on either side thereof originating from a point approximating the pilot's eye position makes it possible for the pilot to readily determine which radial line most closely corresponds to the actual track of the plane as landmarks in alignment therewith are observed for a brief period of time. Thus, actual drift can actually be observed and gauged within tolerance limits of 5° or less.

DESCRIPTION OF DRAWINGS

While essential features of the present drift meter will be understood from the foregoing, a more complete understanding will be apparent from an examination of the drawings wherein:

FIG 1 is a fragmentary schematic plan view of the cockpit of a single engine aircraft having side-by-side pilot and copilot seats.

FIG 2 is a reduced scale plan view similar to FIG 1 illustrating the copilot's alignment of a particular radial line with a ground landmark.

FIG 3 is a schematic plan view of a modified version of the drift meter comprising an arc segment and slide pointer.

FIG 4 is a fragmentary schematic plan view similar to FIG 1 illustrating an adaptation of the modified version of FIG 3 to the cowling of an aircraft.

With reference to FIG 1 the nose of the aircraft 10 has an axial centerline 11 with reference to which magnetic and gyrocompasses are set for navigational purposes. The aircraft illustrated includes a pilot seat 12 for a pilot 13 and a copilot seat 14 for copilot 15, conventional dual controls 16, and a conventional cowling 17 extending above the instrument panel 18 to the windshield 19. A central distinctive line 20 parallel to the centerline 11 is provided on the cowling in alignment with the center of the pilot seat 12 and a similar line 21 is provided in alignment with the center of the copilot seat 14 with incremental radial lines 22, 23, 24 and 25 centered at the pilot's eye position 26 extending respectively in 5° increments to the left of the centerline 20 while similar 5° incremental lines 26, 27, 28 and 29 extend to the centerline depth of the cowling to the right of the centerline 20. Similar and equal incremental lines are likewise provided to the left and right of the copilot's centerline 21 for his use in navigating.

With reference to FIG 2 a typical crosswind 30 from the left of the plane is observed by the copilot 15 to produce a drift to the right which causes the plane to track toward a landmark 31 which remains in alignment with a second line to the right of the centerline thereby indicating a drift of 10° from the plane's centerline 11. Thus, 10° added to the compass reading of the plane would indicate the true direction of flight and permit accurate navigation relative to either a desired "to" or "from" omnibearing or a desired direction of flight as determined by navigation charts.

In actual use under visual flight conditions the drift angle may be readily checked from time to time revealing any change in drift resulting from wind shifts which may frequently be substantial as in the case of passing through frontal weather conditions. The testing of this drift meter system in actual use has revealed a surprising accuracy in maintaining a true course of flight over distances exceeding 100 miles which has made possible, practical and simple direct flights to destinations where direct omni to omnistations are not available or would require dogleg routing.

With reference to FIG 3 a modified version of the drift meter comprises an arc segment 32 adapted for mounting on the cowling in front of the pilot constructed with a radius of curvature corresponding to the approximate distance to the eye position of the pilot, and having a slide pointer 33 adjustable to the tracking position of the plane where 5° incremental markings 34 on the arc segment will indicate the angle of drift.

I claim:

1. An aircraft drift meter adapted for use in an aircraft cockpit having a cowling and pilot seat, comprising linear means extending along the cowling in alignment with the eye position of a pilot in said seat and with the track of the aircraft flight observable with reference to a landmark along said track, and means for gauging the drift angle of said linear means relative to the centerline of the aircraft, said means including a circular arc segment mounted on the cowling of the aircraft, the center of said arcuate segment coinciding with the eye position of the pilot, said linear means comprising a slide pointer mounted on said arc segment for adjustable positioning normal thereto and said gauging means comprising angular deviation indicia on said arc segment.